Sept. 9, 1952 H. C. DAVIS ET AL 2,610,071
WHEELED SHOPPING BAG
Filed Oct. 3, 1949 2 SHEETS—SHEET 1
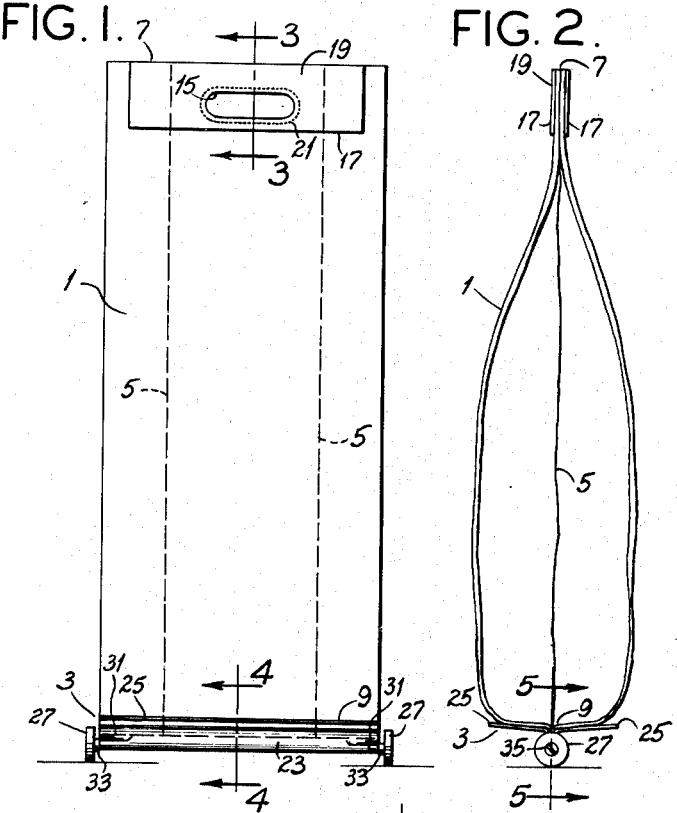
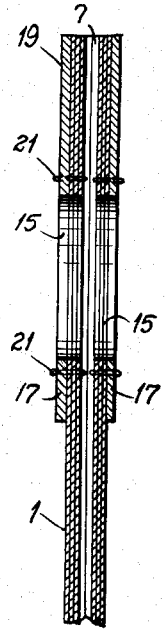
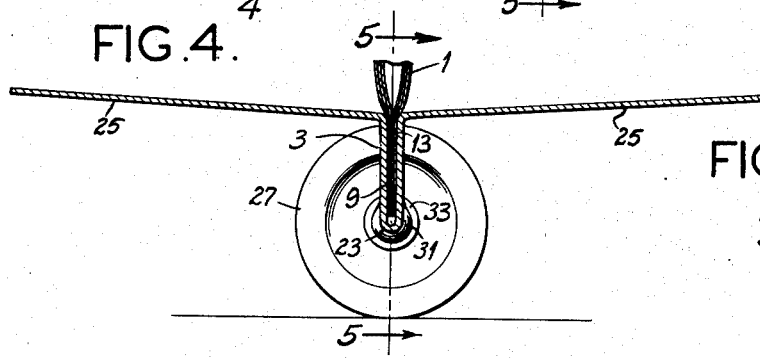
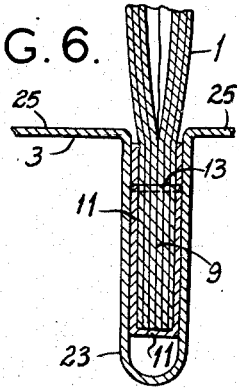
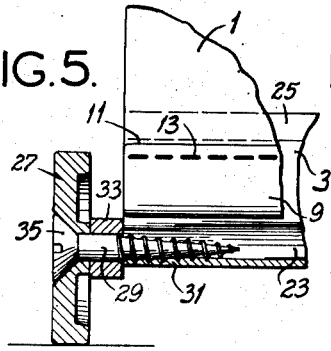
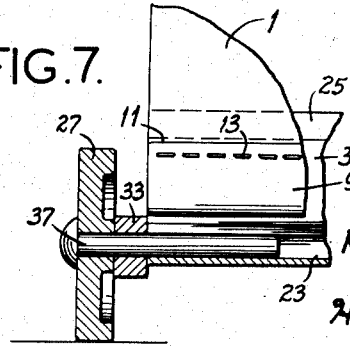
Harold C. Davis,
Robert A. Claridge,
Inventors,
Haynes and Koenig,
Attorneys.

Sept. 9, 1952   H. C. DAVIS ET AL   2,610,071
WHEELED SHOPPING BAG
Filed Oct. 3, 1949   2 SHEETS—SHEET 2

Harold C. Davis,
Robert A. Claridge,
Inventors,
Haynes and Koenig,
Attorneys.

Patented Sept. 9, 1952

2,610,071

UNITED STATES PATENT OFFICE 2,610,071

WHEELED SHOPPING BAG

Harold C. Davis, Webster Groves, and Robert A. Claridge, Affton, Mo., assignors to Bemis Bro. Bag Company, St. Louis, Mo., a corporation of Missouri Application October 3, 1949, Serial No. 119,355

6 Claims. (Cl. 280—36)

This invention relates to shopping vehicles, and more particularly to such vehicles wherein a bag is utilized as a receptacle.

The principal object of the invention is the provision of a simple, low-cost hand-drawn vehicle utilizing a bag as a receptacle particularly for use by shoppers to relieve them of the burden of carrying a heavy load of purchased items. It will be understood, of course, that the vehicle may be employed for purposes other than shopping. In general, the vehicle of this invention comprises the combination of a bag, such as a paper shopping bag, and a rolling carrier attached to the bottom of the bag with the arrangement such that the bag, when loaded, may be rolled from place to place. Preferably, the bag is provided with a handle whereby the vehicle may be conveniently hand drawn. When not in use for transporting goods, the bag conveniently may be wrapped around the carrier to form a compact, easily carried package. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a view in elevation of a vehicle embodying the invention;

Fig. 2 is an end view of the Fig. 1 vehicle, a bag thereof being shown as it appears when loaded;

Fig. 3 is an enlarged fragmentary section on line 3—3 of Fig. 1;

Fig. 4 is an enlarged section on line 4—4 of Fig. 1;

Fig. 5 is a fragmentary section on line 5—5 of Figs. 2 and 4 on the scale of Fig. 4;

Fig. 6 is an enlarged fragmentary detail of Fig. 4;

Fig. 7 is a section like Fig. 5 illustrating a modification;

Similar reference characters indicate corresponding parts throughout the several views of the drawings.

Figure 8:
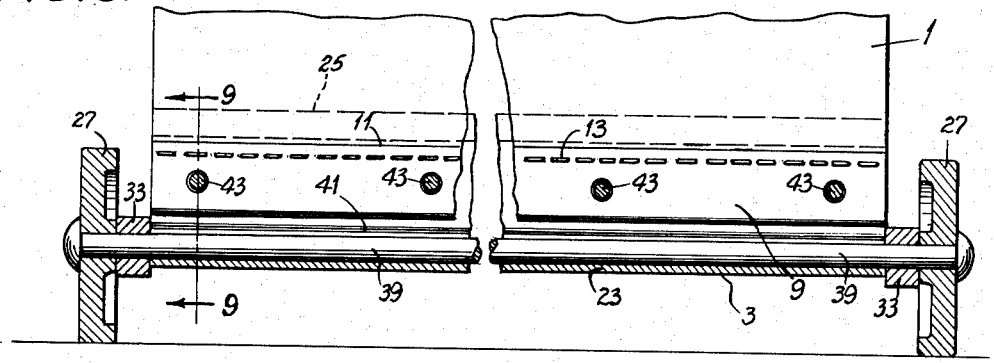
Fig. 8 is a full section similar to Figs. 5 and 7 with parts broken away, illustrating further modifications.

Referring to Figs. 1–6, there is shown at 1 a bag and at 3 a rolling carrier attached to the bottom of the bag. The bag is illustrated as a multiply paper bag having intucked or gusseted sides 5, an open mouth 7, and a closed bottom 9. As best illustrated in Fig. 6, the bottom closure for the bag is formed by a closure tape 11 folded around the bottom of the bag and a sewn seam 13 stitched through the tape and the walls of the bag adjacent its bottom edge. With the tape 11 and seam 13, the bottom 9 of the bag is in the form of a stiff tab extending the full width of the bag. Adjacent the mouth of the bag, its front and back walls are provided with hand holes 15 and with reinforcements 17 in the form of apertured pieces of stiff paper, such as cardboard, to provide a reinforced handle 19 for the bag. The reinforcements preferably extend approximately the full width of the bag and may be attached to the bag walls as by stitching 21, by adhesive, or in any other suitable way. It will be understood that, so far as this invention is concerned, the handle for the bag may be of any suitable construction other than that specifically shown.

The carrier 3, as shown in Figs. 1–5, is made from a rectangular sheet metal blank bent to form a channel 23 receiving the bag bottom 9, with integral bag-supporting wings 25 extending laterally outward from the margins of the channel. The blank is of such dimensions that the channel extends approximately the full width of the bag 1. The channel is made somewhat deeper than the height of the tab-like bag bottom closure 9 and with its nominal inside width slightly less than the thickness of the closure 9. The channel being made of sheet metal, its side walls may be sprung apart to receive the bag bottom closure and then released tightly to clamp the latter with such a tight frictional grip as to resist the bag being pulled out of the channel. Thus, the channel functions as a clamp for the stiff, tab-like bag bottom 9.

The carrier 3 is provided at its ends with wheels 27 located outward of the ends of the bag bottom. As shown, the wheels are journalled on screws 29 which are threaded into the ends of the channel adjacent the bottom of the latter. When the screws are threaded into the ends of the channel, they expand the walls of the channel locally as indicated at 31. Collars 33 are interposed between the wheels and the ends of the channel to keep the wheels outward of the ends of the channel and the ends of the bag bottom. The wheels are held in place between the collars and the heads 35 of the screws. The wheels may be made of any suitable material, plastic, metal or rubber, or may be rubber tired or steel tired rollers.

Figure 11:
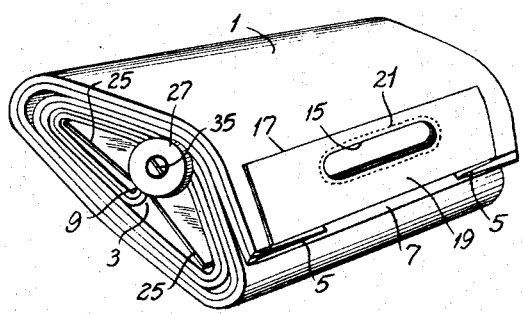
Fig. 11 is a perspective illustrating the Fig. 1 form of the invention with the bag wrapped around the rolling carrier to form a compact package.

With the above-described arrangement, the carrier 3 is readily attached to the bag bottom to make a vehicle receptacle adapted to be rolled from place to place, the bag, which constitutes the receptacle, serving as a low-cost element of the vehicle and eliminating any necessity for any bag-supporting frame or the like other than the simple, low-cost carrier 3. When the bag is filled, it is sufficiently stiffened that the vehicle may readily be drawn about by hand. The height of the bag may be made such that a user may pull the vehicle without stooping. The wings 25 of the carrier act to support the bag when the latter is spread by its contents, as illustrated in Fig. 2. When the vehicle is not being used, the bag may be wrapped around the carrier 3 to form the compact package illustrated in Fig. 11, which may be conveniently stored away or carried. The bag may be removed and replaced at will.

Fig. 7 illustrates a modification in all respects like that shown in Figs. 1-6 except that the wheels 27, instead of being journalled on screws, are journalled on headed pins 37 fixed in the ends of the channel 23.

Figure 9:
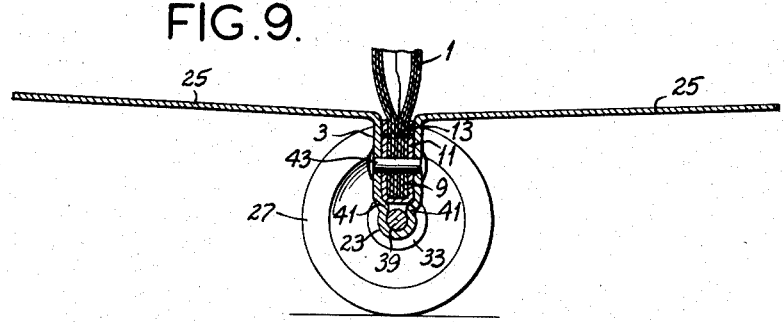
Fig. 9 is a section on line 9—9 of Fig. 8.

Figs. 8 and 9 illustrate an alternative arrangement wherein the wheels 27 are journalled on the ends of a headed rod or axle 39 which extends completely through the bottom of the channel 23 and is fixed therein by indentations 41 in the walls of the channel. Figs. 8 and 9 also illustrate rivets 43 extending across the channel through the bottom closure 9 of the bag to rivet the bag to the carrier 3. By using such rivets, or other suitable fasteners, reliance need not be had solely on the frictional clamping of the bottom closure of the bag in the channel to keep the bag attached to the carrier.

Figure 10:
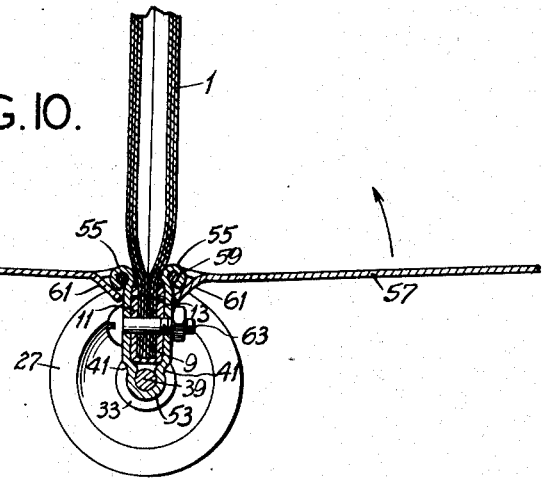
Fig. 10 is a section like Fig. 9 illustrating further modifications.

Fig. 10 illustrates a further alternative arrangement wherein the wings of the carrier are hinged to the channel. As shown, the carrier comprises a sheet metal blank bent to form a channel 53 with hinge eyes 55 at the edges of the channel. Wings 57 are hinged to the edges of the channel as indicated at 59 and are provided with stops 61 to limit the downward swing of the wings so that the wings, when spread, assume a bag-supporting position extending laterally outward from the edges of the channel. Fig. 10 also illustrates how the bottom of the bag may be removably attached to the carrier by bolt and nut fasteners 63, instead of permanent fasteners such as rivets.

It will be understood that other types of bags than the one specifically shown may be used. For example, a multi-ply paper bag having a pasted bottom seam may be used. A single-ply heavy paper bag could be used. The bag may be of waterproof construction, if desired. Even a cloth bag could be used.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. The combination of a bag provided with a handle at its mouth and having a tab-like bottom closure, and a wheeled carrier including a clamp comprising a U-shaped channel receiving the tab-like bottom closure and extending approximately the full width of the bag, the sides of the channel being in clamping engagement with the tab-like bottom closure, and wheels, one at each end of the channel outward of the ends of the bottom closure, each wheel being journalled on a member which is fixed in the channel adjacent its bottom and which extends out of the respective end of the channel.

2. A wheeled carrier for a bag which has a handle at its mouth and a tab-like bottom closure extending the width of the bag, the carrier including a clamp comprising a sheet metal blank bent to form a narrow U-shaped channel adapted to have its sides sprung apart to receive the tab-like bag bottom closure and, upon release, to clamp said tab-like closure, and wheels, one at each end of the channel, each wheel being journalled on a member which is fixed in the channel adjacent its bottom and which extends out of the respective end of the channel.

3. The combination of a bag provided with a handle at its mouth and having a tab-like bottom closure, and a wheeled carrier including a clamp comprising a U-shaped channel receiving the tab-like bottom closure and extending approximately the full width of the bag, the sides of the channel being in clamping engagement with the tab-like bottom closure, and wheels, one at each end of the channel outward of the ends of the bottom closure, each wheel being journalled on a member which is fixed in the channel adjacent its bottom and which extends out of the respective end of the channel, and wings extending laterally outward from the upper margins of the channel for supporting the bag.

4. A wheeled carrier for a bag which has a handle at its mouth and a tab-like bottom closure extending the width of the bag, the carrier including a clamp comprising a sheet metal blank bent to form a narrow U-shaped channel adapted to have its sides sprung apart to receive the tab-like bag bottom closure and, upon release, to clamp said tab-like closure, and wheels, one at each end of the channel, each wheel being journalled on a member which is fixed in the channel adjacent its bottom and which extends out of the respective end of the channel, and bag-supporting wings extending laterally outward from the upper margins of the channel.

5. A wheeled carrier as set forth in claim 4 wherein the wings consist of integral portions of the sheet metal blank bent to extend laterally outward from the upper margins of the channel.

6. A wheeled carrier as set forth in claim 4 wherein the wings are separate members hinged to the upper margins of the channel and having stops engageable with the channel to limit the swinging of the wings so that, when spread, they assume a bag-supporting position extending laterally outward from the upper margins of the channel.

HAROLD C. DAVIS.
ROBERT A. CLARIDGE.

(References on following page)

REFERENCES CITED

The following references are of record in the file of this patent:

UNITED STATES PATENTS

| Number | Name | Date |
|---|---|---|
| 1,276,322 | Bullock | Aug. 20, 1918 |
| 1,590,682 | Hart | June 29, 1926 |
| 2,228,066 | Tashbook | Jan. 7, 1941 |
| 2,459,865 | Bourne | Jan. 25, 1949 |
| 2,465,847 | Coffey | Mar. 29, 1949 |

FOREIGN PATENTS

| Number | Country | Date |
|---|---|---|
| 174,519 | Great Britain | Feb. 2, 1922 |
| 619,759 | France | Apr. 8, 1927 |